(12) United States Patent
Lampert et al.

(10) Patent No.: US 6,588,938 B1
(45) Date of Patent: Jul. 8, 2003

(54) OPTICAL/ELECTRICAL PLUG CONNECTOR

(75) Inventors: Norman R Lampert, Norcross, GA (US); Naif Taleb Subh, Lawrenceville, GA (US)

(73) Assignee: Fitel USA Corp., Norcross, GA (US)

( * ) Notice: Subject to any disclaimer, the term of this patent is extended or adjusted under 35 U.S.C. 154(b) by 51 days.

(21) Appl. No.: 09/690,736

(22) Filed: Oct. 18, 2000

(51) Int. Cl.$^7$ ................................................ G02B 6/38
(52) U.S. Cl. ......................... 385/58; 439/418; 439/451
(58) Field of Search ........................... 385/58, 70, 135, 385/137, 147, 55; 439/577, 418, 451, 610

(56) References Cited

U.S. PATENT DOCUMENTS

| | | | |
|---|---|---|---|
| 3,954,320 A | 5/1976 | Hardesty | 439/418 |
| 4,460,243 A * | 7/1984 | Strait, Jr. | 350/96.21 |
| 4,678,264 A | 7/1987 | Bowen et al. | 350/96.2 |
| 4,978,317 A | 12/1990 | Pocrass | 439/490 |
| 5,052,947 A * | 10/1991 | Brodie et al. | 439/607 |
| 5,109,452 A | 4/1992 | Selvin et al. | 350/69 |
| 5,159,651 A | 10/1992 | Gandy | 385/56 |
| 5,394,503 A | 2/1995 | Dietz, Jr. et al. | 385/135 |
| 5,419,717 A | 5/1995 | Abendschein et al. | 439/577 |
| 5,473,715 A | 12/1995 | Schofield et al. | 385/53 |
| 5,638,474 A | 6/1997 | Lampert et al. | 385/58 |
| 5,647,043 A | 7/1997 | Anderson et al. | 385/55 |
| 5,745,622 A | 4/1998 | Birnbaum et al. | 385/75 |
| 5,896,480 A | 4/1999 | Scharf et al. | 385/88 |
| 6,280,229 B1 * | 8/2001 | Harting et al. | 439/393 |

FOREIGN PATENT DOCUMENTS

| | | |
|---|---|---|
| EP | 0762558 | 12/1997 |
| EP | 1006379 | 7/2000 |
| EP | 0992819 | 12/2000 |

* cited by examiner

Primary Examiner—Javaid H. Nasri
(74) Attorney, Agent, or Firm—Michael A Morra

(57) ABSTRACT

An optical cable tracing system is constructed using an optical/electrical (hybrid) cable 10 containing both optical and electrical transmission media. This cable provides desirably high bandwidth via optical fibers 15 while connection accuracy is provided via electrical wires 13, which are used to operate indicator lights 941 at one or both ends of the cable. A hybrid plug connector 300 terminates the cable at each end and includes a dielectric housing 20, 30 that encloses the optical fiber (glass or plastic), which extends through a front opening 21 in the housing. A single cantilever latch 22 is mounted on a top-side of the housing that is adapted to engage a mating jack receptacle 440 in a locking relationship. A conductor-holding apparatus is molded into the bottom side of the housing where it holds a number of insulated electrical conductors and metallic blade terminals 36 that pierce the insulation and make electrical contact with each of the conductors. The mating jack receptacle includes a row of spaced wire springs 449 at the entrance of the optical connecting portion of the receptacle. The wire springs either extend to an opposite side of the receptacle to provide electrical interconnection between a pair of hybrid plug connectors, or the wire springs are arrayed to fit into a printed wiring board 710 for interconnection with electrical circuitry 730 thereon.

28 Claims, 8 Drawing Sheets

OPTICAL/ELECTRICAL PLUG CONNECTOR

CROSS REFERENCE TO RELATED APPLICATIONS

This patent application is related to Application Ser. No. 09/690,735 and to Application Ser. No. 09/690,744, both of which were filed on Oct. 18, 2000.

TECHNICAL FIELD

This invention relates to optical connectors and, more particularly, to optical plugs that include electrical connectors.

BACKGROUND OF THE INVENTION

The growth in optical communications has been fueled by the extraordinary bandwidth that is available on optical fiber. Such bandwidth enables thousands of telephone conversations and television channels to be transmitted simultaneously over a hair-thin fiber that is made from a high-quality glass material. Nevertheless, bandwidth alone cannot satisfy some very simple needs that are easily handled by electrical cables. For example, electrical signals are the only practical way to interact with the existing communications infrastructure (e.g., standard telephone equipment) or even to operate a simple indicator lamp. And so it seems likely that the most desirable cables will combine electrical wires and optical fibers to enable designers to take maximum advantage of the strengths of each media. And while hybrid (i.e., electrical/optical) cables exist, hardware for connecting such cables to other communication equipment is presently too large, too costly or too cumbersome.

For example, patch panels are used to interconnect specific customers and equipment to other specific customers and equipment, and it is imperative that the interconnections be made accurately. One system is shown in U.S. Pat. No. 5,394,503, which discloses an optical fiber patch cable having end connectors that are arranged to operatively connect with patch panel couplings. Each patch cable includes one or more optical fibers and one or more electrical conductors. However, these end connectors and couplings are relatively bulky with large cross-section areas, each having many individual parts that do not yield to machine assembly. Consequently, they are neither space nor cost effective. Space is at a premium in such patch panels and an optical/electrical connector arrangement having a small footprint (i.e., cross-section area) is desirable, as is the ability to easily insert and remove closely spaced connectors in the patch panel.

Other hybrid connectors are known in the art and shown in: U.S. Pat. No. 5,109,452; U.S. Pat. No. 5,159,651; U.S. Pat. No. 5,473,715, and U.S. Pat. No. 5,745,622. However, none of these connectors provides the desired cost and space effectiveness. Some connectors have multiple latches while others require twisting, which means that additional separation between connectors is required so that an installer's fingers can be positioned on both sides of the connector during installation and removal.

Another deficiency associated with many known plug connectors is that it takes too much effort to align the connector during installation because both electrical and optical connections need to be simultaneously engaged. This is the natural result of attempting to align a large number of connections at the same time.

Accordingly, what is desired is an optical/electrical plug connector that can be easily installed into a receptacle without significant alignment effort. Additionally, it is desirable that the optical/electrical plug connector have a relatively small cross-section area, a reduced number of parts, and the ability to easily install or remove from a densely packed patch panel.

SUMMARY OF THE INVENTION

The above-described deficiencies are overcome by an optical/electrical plug connector for terminating g optical and electrical transmission media. The plug connector includes a dielectric housing that encloses a fiber-holding apparatus, which supports an optical fiber that extends through a front opening in the housing. The plug connector further includes a back opening in the housing for receiving the optical fiber. A single cantilever latch is mounted on a top-side of the housing with its fixed end positioned toward the front opening and its free end extending toward the back opening. The latch is adapted to engage an associated receptacle in a locking relationship. A conductor-holding apparatus is positioned on a bottom side of the housing that is adapted to receive a number of insulated electrical conductors. The conductor-holding apparatus includes an equal number of metallic blade terminals that extend into the bottom side of the housing, pierce the insulation of the electrical conductors, and make electrical contact therewith.

In a preferred embodiment of the invention, the plug connector is designed to terminate one optical fiber and four insulated electrical conductors. Illustratively, the optical fiber may be glass or plastic. In the preferred embodiment, the optical fiber and the electrical conductors are contained within a single cable.

The optical/electrical plug connector of the present invention is suitable for high density panel mounting because the latch is positioned on the top side of the housing and the electrical connection apparatus is positioned on its bottom side. Such construction permits the left and right sides of the plug connector to be unencumbered by latching mechanisms. Indeed, because only minimum space is required on the lateral sides, jack structures having closely spaced (side-by-side) receptacles can be used in high-density applications.

Moreover, the plug connector of the present invention includes an optical plug portion that is designed to enter the associated jack receptacle before the electrical plug portion of the connector is engaged. In the preferred embodiment of the invention, the metallic blade terminals of the electrical plug portion are located at about the midpoint of the housing, although satisfactory alignment is achieved with only about twenty (20) percent of housing inserted in the jack receptacle before electrical contact is made. At this point, the optical plug portion of the connector is already providing meaningful assistance in the alignment of the electrical plug portion.

BRIEF DESCRIPTION OF THE DRAWING

The invention and its mode of operation will be more clearly understood from the following detailed description when read with the appended drawing in which.

DETAILED DESCRIPTION

Figure 1:
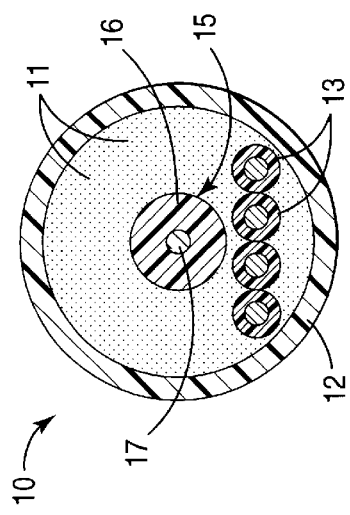
FIG. 1 is a cross-section view of a cable containing optical and electrical transmission media.

The present invention solves a number of problems that are related to the combination of electrical and optical transmission media. As discussed above, each of these different transmission media has its own unique advantages and disadvantages, and neither one is suited to handle the tasks the other performs effortlessly. For example, optical fibers are terrible conductors of electricity, even small amounts; whereas electrical conductors do not approach the bandwidth that is readily available on an optical fiber. Accordingly, cables containing both optical and electrical transmission media have been developed to exploit the best features of each. One such cable is shown in FIG. 1, which is a cross-section view of a cable 10 that contains a buffered optical fiber 15 and four insulated electrical conductors, collectively designated by the numeral 13. These transmission media are surrounded by a number of filamentary (yarn-like) strength members 11 that are preferably made from aramid fibers. The strength members 11 impart significant tensile strength to the cable 10 and protect the optical fiber from undue strain that may be applied to the cable during service and handling. Whereas only one optical fiber and four electrical conductors are shown, it is understood that the cable could contain any number of optical fibers and electrical conductors without departure from the invention.

In this example cable, the buffered optical fiber 15 comprises a glass fiber 17 (diameter about 125 microns) having one or more layers of protective coating material (overall diameter now about 250 microns) and a layer of a polymeric material 16 such as nylon (overall diameter now about 1 millimeter) to buffer the optical fiber. Alternatively, buffered optical fiber 15 could be a plastic fiber whose diameter is also about 1 millimeter. In this situation, there is no need for a cylindrical ferrule to support the fiber and there is no need for strength member in the cable. Nevertheless, in the illustrative cable 10, the electrical conductors 13 comprise 26 gauge copper wire surrounded by a layer of polyvinylidine fluoride insulation. Finally, the cable 10 includes an outer jacket 12 comprising polyvinyl chloride (PVC). Because this particular cable is for use within a building, the PVC is blended with filler materials that render it flame retardant.

Optical/Electrical Plug Connector

Figure 3:
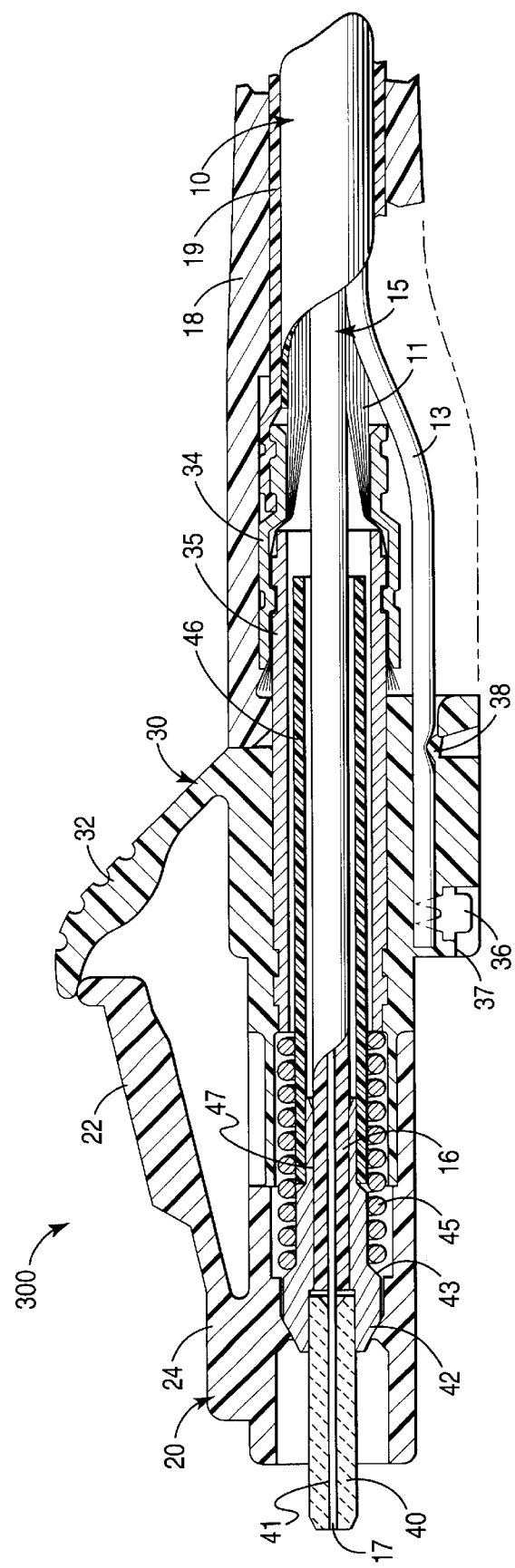
FIG. 3 discloses a cross-section view of the optical/electrical plug connector.
Figure 2:
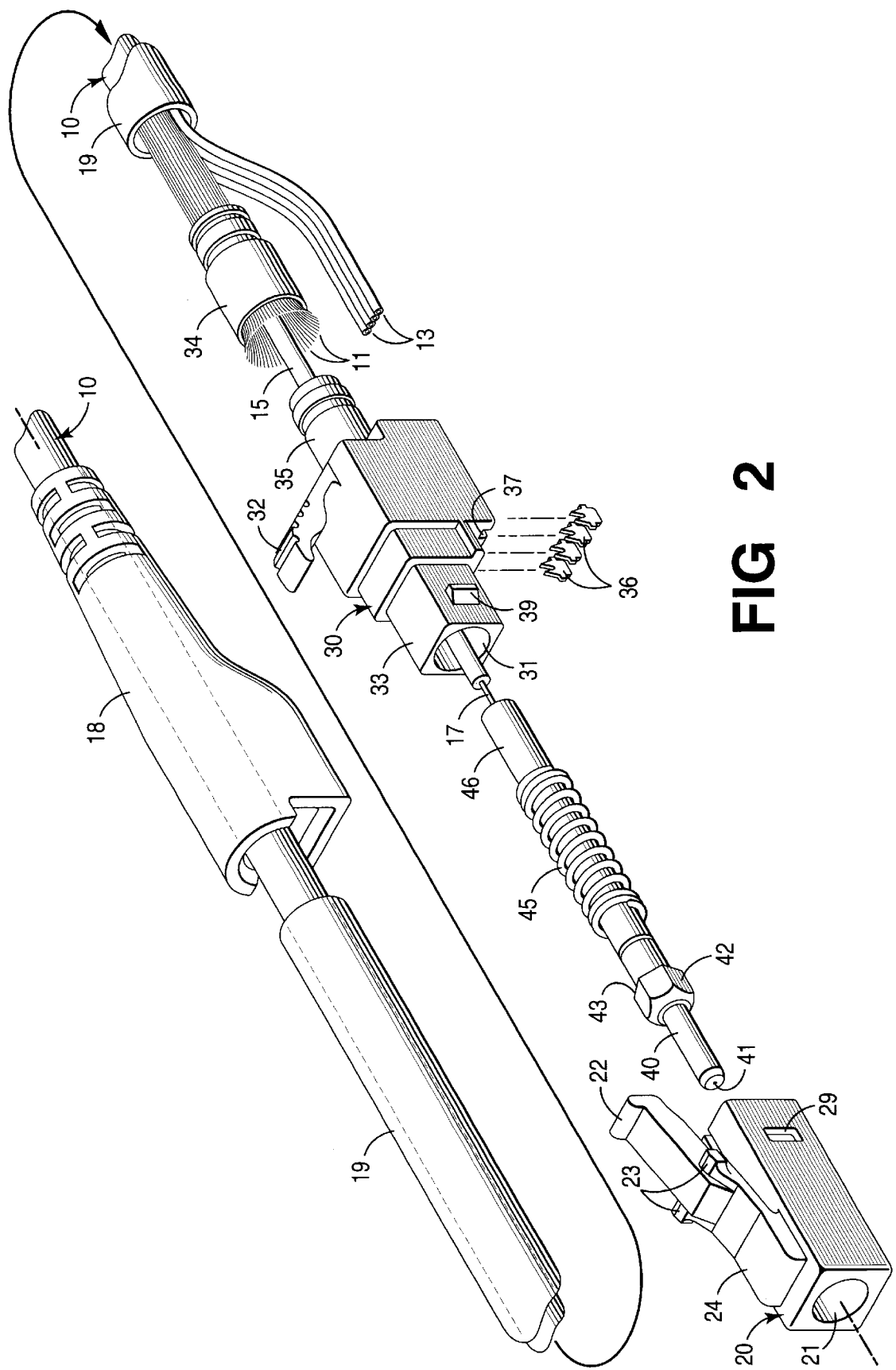
FIG. 2 shows an exploded perspective view of an optical/electrical plug connector, demonstrating its assembly and attachment to the cable shown in FIG. 1.

Cable 10 is shown connected to a novel optical/electrical (hybrid) plug connector in FIGS. 2 and 3. The plug connector comprises a two-piece housing structure 20, 30 although it is clear that the housing could be constructed as a unipartite structure similar to the one shown in Application Ser. No. 09/524,335 (Driscoll 6-40-6-6-9). A front opening 21 in housing structure 20 extends into a cavity that encloses a fiber-holding structure comprising a cylindrical ferrule 40 and a base member 42, which is generally referred to as a "barrel." An axial passageway 41 extends through the ferrule and is sized to receive an end portion of a glass fiber 17 after its protective coating and buffer layer 16 have been removed. The glass fiber 17 is held within the axial passageway 41 by an adhesive, and the buffer layer 16 is held within a bore 47 in the back end of barrel 42. Illustratively, the ferrule comprises a ceramic material such as zirconium and it is held within a cylindrical opening in barrel 42, which is typically made from metal or plastic and includes an axial bore in its front end that is shaped to receive and hold an end portion of the cylindrical ferrule 40. A plastic tube 46 surrounds the back end of the barrel 42, and both are encircled by a helical spring member 45. One end of the spring presses against a flange 43 on the barrel while the other end presses against a stop within an opening 31 in housing structure 30 in order to urge the front end of the ferrule 40 through the opening 21 in the housing member 20.

Figure 4:
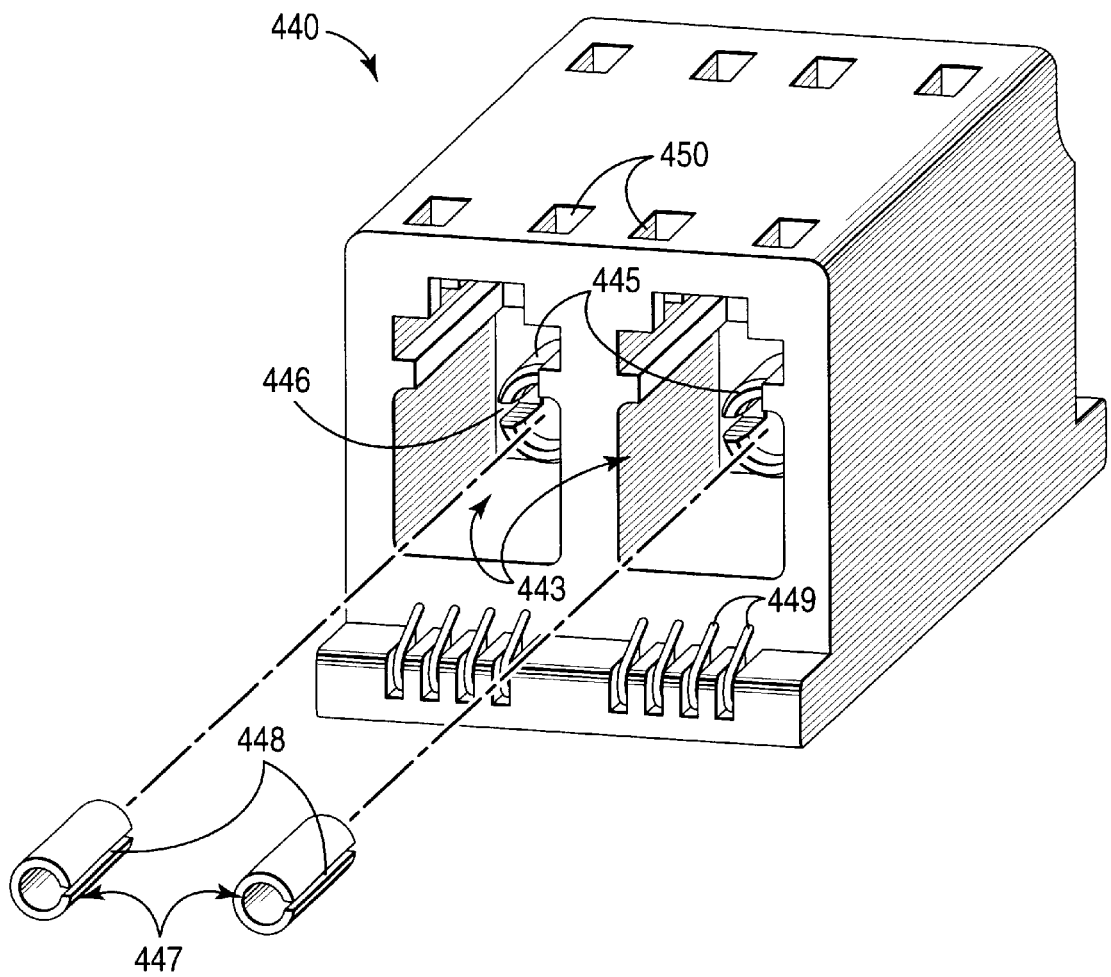
FIG. 4 is a back end perspective view of an optical/electrical jack receptacle having a pair of side-by-side openings for receiving a pair of optical/electrical plug connectors.
Figure 5:
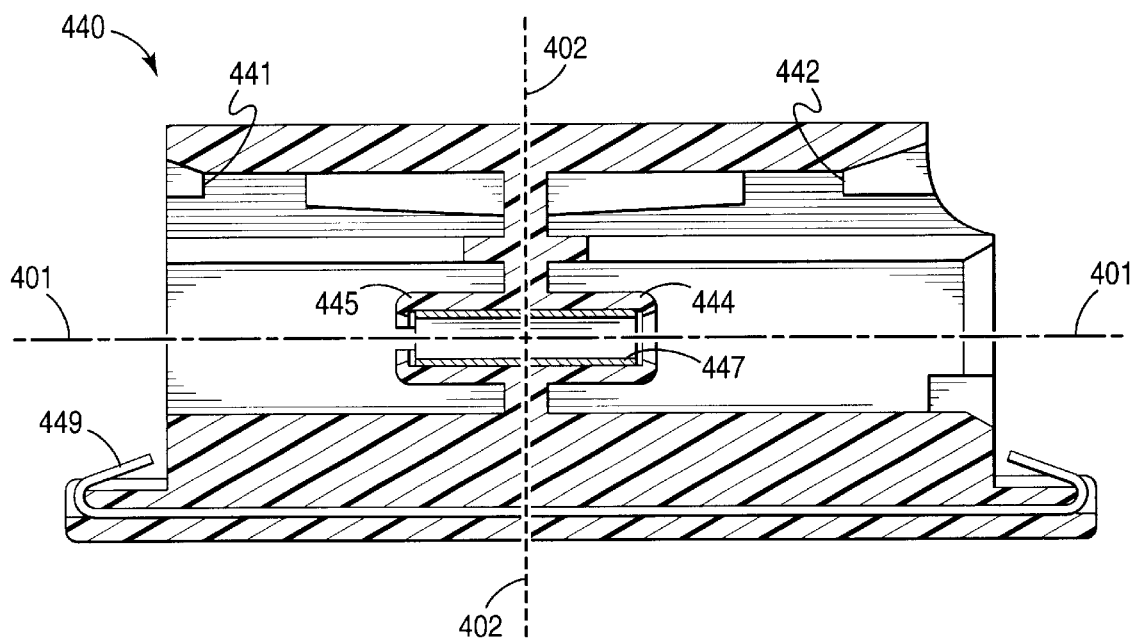
FIG. 5 discloses one embodiment of the optical/electrical jack receptacle in which electrical conductors extend continuously between the front and back sides of the receptacle.

The first housing structure 20 includes a single cantilever latch 22 on its top side that is designed to interlock with a mating jack receptacle 440 (see FIGS. 4 and 5). The cantilever has a fixed end 24, which is positioned toward the front opening 21 in the housing structure 20, and a free end that extends toward the back of the housing structure. The cantilever deflects downwardly so that a pair of shoulders 23—23 can enter the jack receptacle 440 and interlock with a ledge 441 or 442 therein (see FIG. 5).

The second housing structure 30 includes a forward projection 33 that fits into an opening in the back end of housing structure 20. These two housing structures 20, 30 conveniently interlock via a wedge-shaped tab 39 on housing structure 30 and a mating slot 29 in housing structure 20. An opening 31 in the forward projection 33 extends axially and completely through the housing structure 30 as well as through a cylindrical, metallic crimp tube 35, which is insert-molded into the back end of housing structure 30.

Housing structure 30 further includes a cantilever trigger 32 on its top side that is designed to interact with cantilever latch 22 on housing structure 20. The cantilever trigger 32 has a fixed end that is positioned toward the back end of the housing structure 30 and a free end that extends toward the front of the housing structure 30. The free end of the trigger 32 is designed to slidably engage and deflect the free end of latch 22 downwardly when it is depressed. Advantageously, the trigger 32 not only keeps the two-piece housing structure 20, 30 from snagging other cables when pulled in a backward direction through a bundle of cords, but also renders the latch 22 easier to operate.

During assembly, the bend-limiting device 18, the heat-shrink tube 19, and metallic crimp sleeve 34 are fed onto the unstripped cable 10. Appropriate lengths of various cable components are then removed. These components illustratively include: cable jacket 12; buffer layer 16; the protective coating on glass fiber 17; and the aramid strength members 11. Adhesive is then injected with a syringe into bores 41 and 47. The insulated conductors are withdrawn from the metallic crimp sleeve 34 and the remainder of cable 10 is inserted into the connector 300 so that the glass fiber 17 resides within axial passageway 41 of the ferrule 40, and the buffer layer 16 resides within bore 47 of barrel 42. The aramid strength members 11 are positioned over the outer surface of the crimp tube 35 and "sandwiched" between the crimp tube 35 and the crimp sleeve 34—the latter being deformed by a tool that firmly joins them together. In addition to friction, grooves are provided on the outer surface of the crimp tube 35 to improve the mechanical connection between the strength members 11 and the crimp tube.

Electrical conductors 13 are then routed around the crimp sleeve 34 and into the bottom-side portion of housing 30, which is designed to operate as an electrical plug. A number of slots 37 are adapted to receive a like number of conductive terminal blades 36 that are shaped to pierce the insulation on the electrical conductors 13. The blades 36 are pressed upwardly into the bottom-side portion of housing 30 in order to engage each insulated conductor 13. After the crimp sleeve 34 has been deformed onto the crimp tube 35 and the electrical conductors 13 have been installed, a length of heat-shrink tubing 19 is moved forward to encircle at least a portion of the crimp sleeve 34. The heat-shrink tubing is then heated to hold the outer jacket 12 (see FIG. 1) and the conductors 13 against the crimp sleeve. A bend-limiting device 18 is finally pushed forward to meet the back end of housing 30 in order to increase the bending radius of the cable 10 at this point. Sharp bends increase the transmission loss of an optical fiber. It is noted that the length of the shrink tubing 19 is somewhat longer than the bend-limiting device 18, and that it operates to provide additional rigidity to the cable in the region at the rear of the bend limiting device 18 where severe bending first occurs at light loads.

FIG. 3 provides a cross-section view of the optical/electrical plug connector 300 after assembly to the cable 10. Of particular interest in FIG. 3 is the design of the electrical connecting device on the bottom-side portion of housing structure 30. Illustratively, the electrical conductors 13 are formed as a flat cord, which is held in the bottom side portion of housing 30 by an integrally formed anchor member 38. The anchor member is shaped to provide strain relief to the conductors 13 and to interlock with an adjacent portion of the housing structure 30 after it is pressed toward the cord. The design of insulation-piercing blades 36, blade-receiving slots 37, and anchor member 38 are disclosed in U.S. Pat. No. 3,954,320, which is hereby incorporated by reference.

Advantageously, the structure of the above-described optical/electrical (hybrid) plug connector 300 is substantially similar to existing LC-type connector plugs such as disclosed in U.S. Pat. No. 5,638,474. Consequently, it is backward compatible with existing optical jack receptacles such as shown U.S. Pat. No. 5,647,043. Nevertheless, such existing optical receptacles are modified as shown in FIG. 4, herein, to provide electrical connections. However, unlike many prior art hybrid connectors, the addition of electrical connections does not increase the effort required to align the connections during installation. Before the electrical contacts 36 in plug connector 300 (see FIG. 3) make contact with wire springs 449 in the jack receptacle 440, the front end of the plug connector is already installed into the jack receptacle 440 and is guiding the electrical contacts into alignment. This is accomplished by locating the electrical contacts 36 well behind the front end of the plug connector (i.e., by an amount that exceeds twenty percent of the overall length of the housing structure). Moreover, the design of plug connector 300 avoids the use of latching apparatus on opposite sides and avoids the need for the installer to grasp both sides of the plug connector to twist it into engagement with a jack receptacle. As a result, and as shown in FIG. 4, cavities 443 in the jack receptacle 440 for receiving optical plugs can be closely spaced, side by side, to receive the plug connectors in a dense array.

Optical/Electrical Jack Receptacle

Although jack receptacle 440 includes front-end and back-end portions, both of which comprise jack receptacles, it is molded as a single part as shown in FIGS. 4 and 5. The front-end and back-end portions meet at an optical plane 402 where the ferrules of optical plugs meet. Each cavity 443 is shaped to receive an optical plug such as the LC type discussed above, and each cavity includes a generally square entrance for receiving an optical plug. Above the generally square entrance is another entrance for receiving the latch on the optical plug. The length of the cavity in the longitudinal direction is greater than the width of the generally square entrance, and this operates to align the plug connector 300 prior to electrical contact (see FIG. 13 for example). A common longitudinal axis 401—401 extends through cavities that are positioned back-to-back with bosses 444, 445 projecting into each cavity. Illustratively, the boss 445 includes a flexible bifurcation 446 that enables an alignment sleeve 447 to be installed without damage to the boss 445. The alignment sleeve 447 includes a slit 448 along its length so that it can be made with a slightly smaller diameter than the ferrules it will ultimately surround and hold in axial alignment. Bosses 444, 445 surround and capture the alignment sleeve 447, which extends through the optical plane 402 where the end faces of a pair of optical plugs touch each other. Moreover, the alignment sleeve 447 has a central axis that is collinear with the longitudinal axis 401—401 that extends between pairs of back-to-back cavities. Each cavity further includes internal latching surfaces 441, 442 for interlocking with the shoulders 23 on the latch 22 of plug connector 300 (see FIG. 2). Such internal latching surfaces are formed during the molding process by cores in the mold tool that create and extend through holes 450 in the top surface of the jack receptacle 440. FIG. 5 demonstrates that the wire springs 449 extend between opposite sides of the receptacle 440 in order to electrically interconnect a pair of plug connectors 300 that are installed on opposite sides of the optical plane 402. Preferably, the wires 449 are crossed, left-to-right, as they extend between opposite sides of the receptacle 440 so that the left-side contact of a plug connector 300 installed in one side of receptacle 440 will be connected to the left-side contact of another plug connector 300 installed in the opposite side of receptacle 440. The wires 449 may be molded into the body of the jack receptacle 440 or may be laid into grooves in its bottom side as discussed below in connection with FIG. 10.

Figure 6:
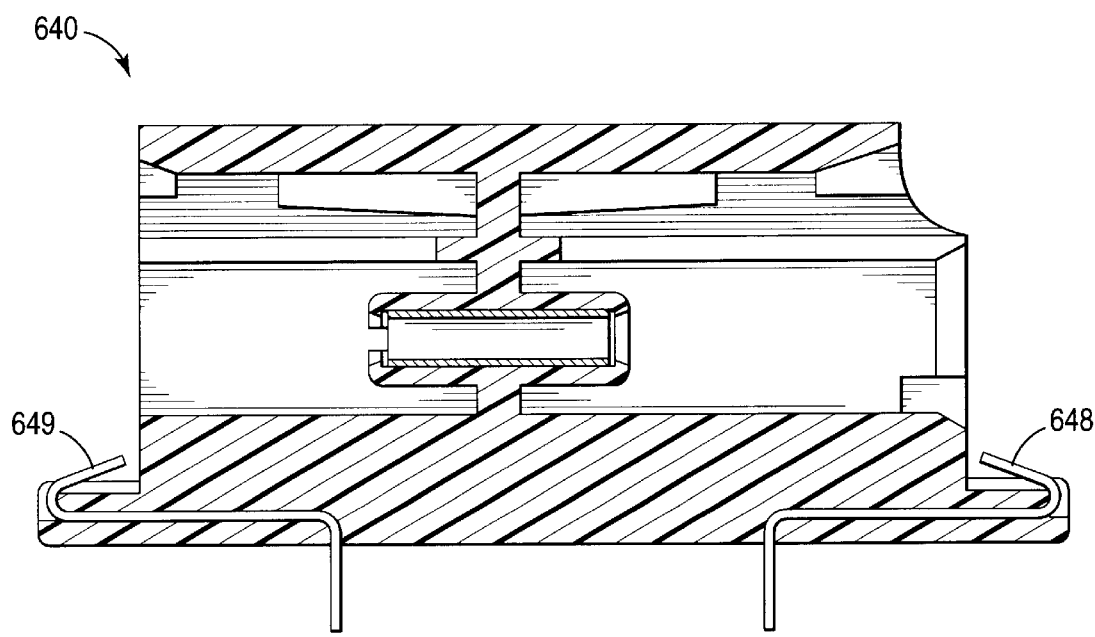
FIG. 6 discloses another embodiment of an optical/electrical jack receptacle in which electrical conductors are arranged for mounting on a printed wiring board.
Figure 7:
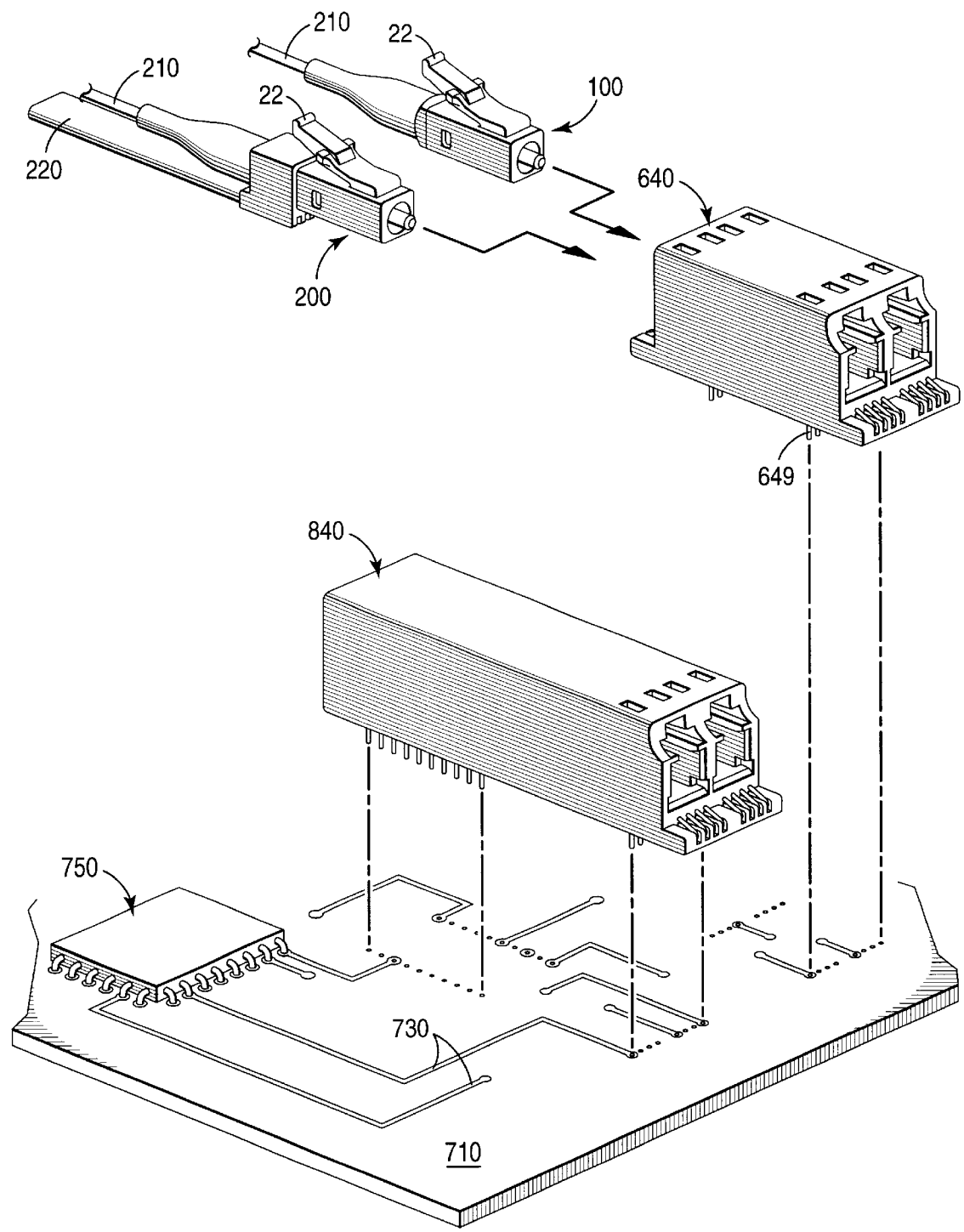
FIG. 7 is an exploded perspective view of a printed wiring board containing various components that facilitate the processing of optical and electrical signals.

FIG. 6 discloses another embodiment of a jack receptacle 640 which is designed for mounting on a printed wiring board 710 (PVB) such as shown in FIG. 7. Here, wire springs 648, 649 are bent downward for PWB insertion. Conductive paths 730 on the PWB 710 make connections between the wire springs 648, 649 themselves, and between these wire springs and any other component 750, 840 on the PWB. Illustratively, PWB 710 includes an integrated circuit 750, which processes electrical signals and exchanges them with optical device 840 where conversion between electrical and optical signals is made. FIG. 7 illustrates that the jack receptacles of the present invention (e.g., receptacle 640) are compatible with existing optical plugs. For example, optical plug 100 is a known device that is disclosed in U.S. Pat. No. 5,719,977. Here, plug 100 terminates a buffered optical cable 210 that contains no electrical wires. FIG. 7 further illustrates that optical/electrical plug connectors of the present invention (e.g., connector 200) may be constructed without a trigger member 32 such as shown in FIG. 2 to operate latch 22; and that optical/electrical plug connectors of the present invention may terminate a pair of separate cables, one buffered cable 210 containing optical fibers exclusively and the other cable 220 containing electrical wires exclusively.

Figure 8:
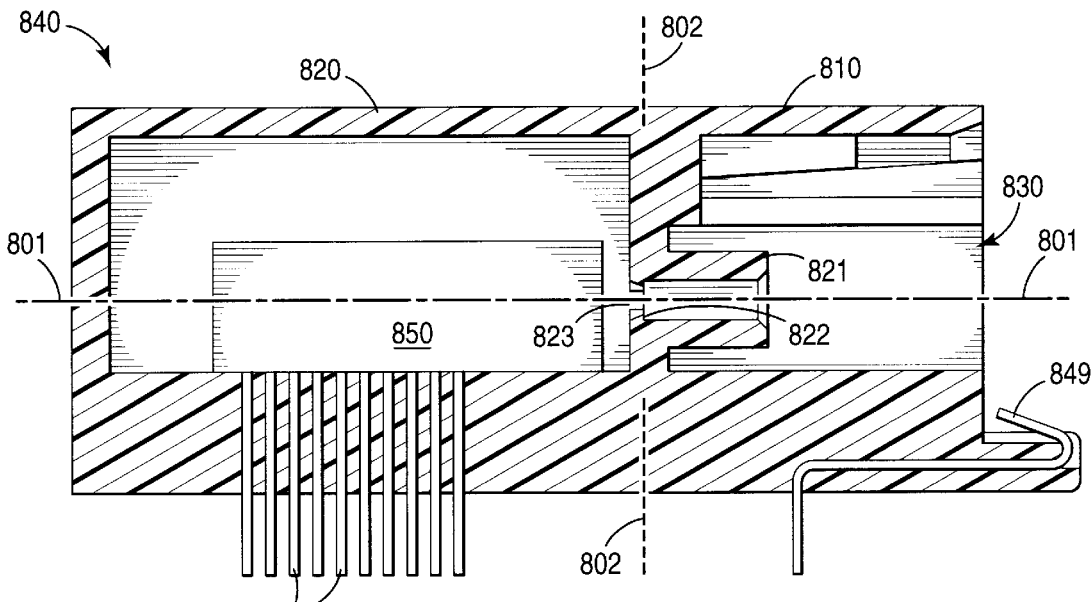
FIG. 8 is a cross-section view of an optical transceiver that is arranged to transmit and/or receive electrical and optical signals.

Reference is now made to FIG. 8 for a cross-section view of optical device 840, which includes a front-end portion 810 and a back-end portion 820 that are separated at the optical plane 802—802 where the end face of a ferrule of an optical plug installed within cavity 830 effectively resides against a stop 822 having an opening 823, which is between 0.3–0.5 millimeters in diameter. Cavity 830 comprises a generally rectangular opening that is shaped to receive an optical plug such as the LC type. A longitudinal axis 801—801 extends through cavity 830 and boss 821, which supports the ferrule of the optical plug. The central axis of the boss 821 is collinear with the longitudinal axis 801—801. Illustratively, an electrical-to-optical transducer 850, such as a detector or semiconductor laser, is mounted in the back-end portion 820 of the optical device 840. It is positioned to collect or emit light respectively along the central axis 801—801. Because bi-directional optical transmission is desirable, optical device 840 generally comprises a pair of side-by-side receptacles as shown in FIG. 7: one for transmitting optical signals via a fiber stub (not shown) and the other for receiving optical signals. Extending downwardly from the optical device 840 are pins 845 that are attached to the transducer 850, and wire springs 849 that make electrical connection to an optical/electrical plug connector such plug connector 300 (see FIG. 2).

Optical Cable Tracing System

Figure 9:
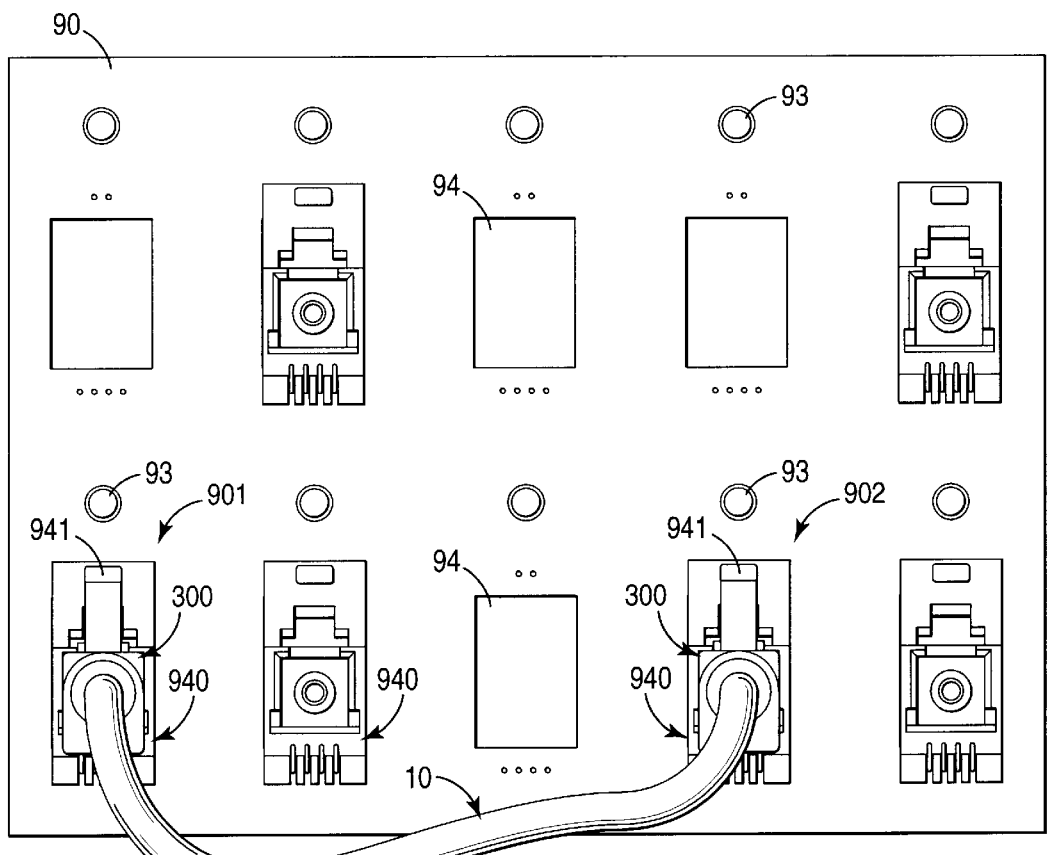
FIG. 9 discloses a patch panel that is used in making optical interconnections.

FIG. 9 illustrates a cable tracing system for optical fibers that use the above-described optical/electrical plug connector and the above-described optical/electrical jack connector. A hybrid cable provides desirably high bandwidth via optical fibers while connection accuracy is provided via electrical wires, which are used to operate indicator lights at one or both ends of the cable. In particular, the proposed system provides an intuitive technique for determining the physical location of two ends of a fiber optic jumper that is used to complete a cross-connection on a fiber distribution frame. Disconnecting the wrong jumper cable would interrupt service on another fiber path, and this makes proper identification of jumper cables critical. The present system solves the problem of the significant revenue loss and customer dissatisfaction that is attributable to service disruptions caused by improper path disconnection. This is of extraordinary importance in an optical fiber system where a single fiber may be carrying thousands of telephone conversations and television channels.

Figure 10:
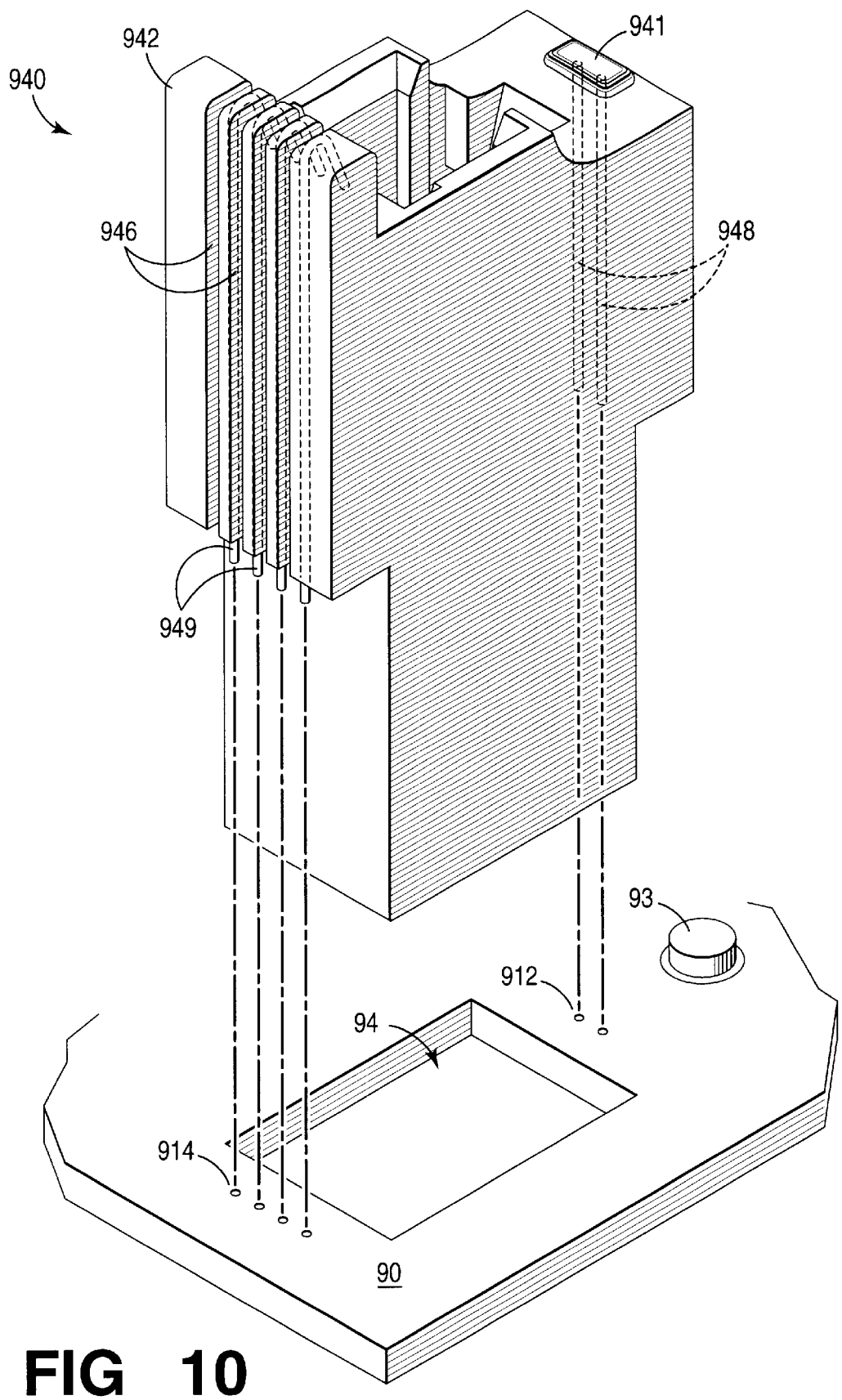
FIG. 10 is an exploded perspective view of a portion of the patch panel of FIG. 9 showing an optical/electrical jack receptacle being installed into the panel.

FIG. 9 discloses an optical fiber cross-connection panel 90 (generally referred to as a patch panel) that contains a number of optical receptacles 940 that need to be interconnected to provide, maintain, and rearrange service. Pairs of receptacles are interconnected by a jumper cable 10 that contains at least one optical fiber. Although FIG. 9 shows interconnections between receptacles on the same patch panel 90 for ease of illustrating the invention, it is understood that the ability to identify opposite ends of a jumper cable is even more valuable when the cable extends between a pair of patch panels that are separated by a significant distance such as between floors of a building. Each end of the cable 10 terminates in an optical plug that inserts into an optical jack 940. The present invention provides the ability to quickly and accurately identify opposite ends of an optical cable by adding at least one electrical wire to the path of the optical cable. This is preferably accomplished by using a cable of the type shown in FIGS. 1 and 2, which contains both optical and electrical transmission media. Moreover, this is preferably accomplished by terminating each end of the cable 10 with an optical/electrical plug connector of the type shown in FIGS. 2 and 3. A cable having connectors at each end is generally known as a "jumper." Finally, this is preferably accomplished by using optical/electrical jack receptacles of the type disclosed in FIGS. 4–6, although a design for an optical/electrical jack receptacle that is better suited for use in a cable tracing system is shown in FIG. 10. With continuing reference to FIG. 9, it is noted that an indicator light 941 is positioned above each receptacle 940.

This light 941 may either be part of the receptacle 940 or it may be a separate light that mounts directly to the panel 90. It is also noted that a switch 93 is positioned on the top side of each receptacle 940. Each end of the cable 10 is inserted into a receptacle 940. One end is installed into the receptacle at location 901 while the other end is installed into the receptacle at location 902. Cable tracing is achieved by operating the switch 93 at location 901, which causes the light 941 at location 902 to glow. Alternatively, operating the switch at location 902 causes the light at location 901 to glow. In another embodiment of the invention, operating the switch 93 at either end of the cable causes the lights 941 at both ends to glow. Apparatus for achieving such results is described below.

FIG. 10 is an exploded perspective view of a portion of the patch panel 90 shown in FIG. 9 to illustrate the installation of a jack receptacle 940 into the panel. The jack receptacle 940 is suitable for receiving a plug connector, such as shown in FIG. 3 that delivers optical and electrical signals to the panel as discussed above. Electrical connection to the jack receptacle 940 is made via conductive elements 949 that are positioned in grooves 946, which are molded into the bottom side of receptacle 940. The conductive elements 949 protrude from the receptacle to facilitate installation into plated-thru holes 914 (sometimes referred to as "vias") in the panel 90, which illustratively comprises a printed wiring board. The conductive elements 949 also wrap around a protrusion 942 at the front end of the receptacle and function as spring contacts for making electrical connection to mating terminals in the plug connector. Illustratively, the conductive elements are stamped from 0.015 inch (0.38 millimeter) metal stock and gold plated in the region of the protrusion 942. The conductive elements are fabricated together as a unit, which is known as a "lead frame" and which is positioned into the grooves 946 of the receptacle. Because a portion of the lead frame is used as a spring contact, the entire lead frame is made from a resilient metal such a beryllium-copper, although a variety of other metal alloys can be used with similar results. The receptacle 940 is illustratively made from a thermoplastic material such as polycarbonate. Once the lead frame is installed, heat is applied to the grooves 946 to deform them and, thereby, lock the conductive elements 949 in place.

The receptacle 940 further includes a lamp member 941, illustratively a light-emitting diode (LED), that is activated by the application of a small voltage onto a wire pair 948—948. LED 941 and its associated wire pair are molded into the receptacle 940. Wire pair 948—948 protrude from the receptacle to facilitate installation into vias 912. And while it is convenient to have the lamp 941 molded into receptacle 940, it is understood that the light can be separately installed in panel 90 to provide the desired visual indication.

Figure 11:
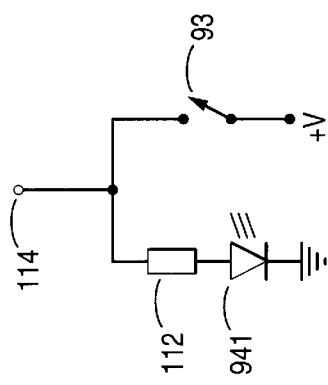
FIG. 11 is a schematic of one embodiment of an electrical circuit, which is associated with each jack receptacle in the patch panel of FIG. 9.
Figure 12:
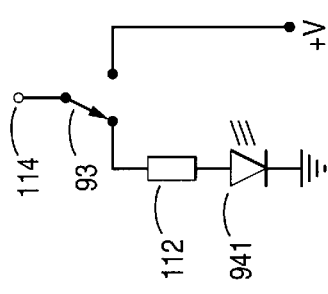
FIG. 12 is a schematic of another embodiment of an electrical circuit, which is associated with each jack receptacle in the patch panel of FIG. 9.

Illustratively, switch 93 is a single pole single throw (SPST) switch that is installed in panel 90 adjacent to an opening 94, which is shaped to receive the receptacle 940. Preferably, the switch 93 includes a spring member that causes it to return to its original state when released. FIG. 11 and 12 illustrate two different arrangements for interconnecting the lights and switches at each location 901, 901 (see FIG. 9).

In one embodiment, the electrical circuit shown in FIG. 11 is installed at each location 901, 902 when it is desirable to only cause the light at the far end of the cable (e.g., location 902) to glow when the switch 93 at the near end of the cable (e.g., location 901) is operated. Switch 93 is shown in its normal state whereby one voltage (zero volts or "ground") is present at terminal 114 via light emitting diode (LED) 941 and current-limiting resistor 112. At location 901, terminal 114 is connected to one of the wires 949 on the jack receptacle 940 (see FIG. 10) via wiring paths on panel 90, which illustratively comprises a printed wiring board. An optical/electrical plug connector 300 (see FIGS. 2, 3) is inserted into the jack receptacle 940 at location 901 and carries the ground voltage to location 902 where it is connected to an electrical circuit that is similar to the one shown in FIG. 11. The overall circuit now comprises an LED 941, a resistor 112 and a switch 93 at each end of a series connection between identical voltages (grounds). However, when the switch at one end is depressed, another voltage (+V) is applied to the circuit causing the LED at the other end to glow. This is because switch 93 is arranged to complete an electrical path from ground through only one of the LEDs to +V.

In another embodiment, the electrical circuit shown in FIG. 12 is installed at each location 901, 902 when it is desirable to cause the lights at the both ends of the cable (e.g., locations 901 and 902) to glow when the switch 93 at either location is operated. Switch 93 is shown in its normal state whereby one voltage (ground) is present on terminal 114 through light emitting diode (LED) 941 and current-limiting resistor 112. At location 901, terminal 114 is connected to one of the wires 949 on the jack receptacle 940 (see FIG. 10) via wiring paths on panel 90, which illustratively comprises a printed wiring board. An optical/electrical plug connector 300 (see FIGS. 2, 3) is inserted into the jack receptacle 940 at location 901 and carries the ground voltage to location 902 where it is connected to an electrical circuit that is similar to the one shown in FIG. 12. The overall circuit now comprises an LED 941, a resistor 112 and a switch 93 at each end of a series connection between identical voltages (grounds). When the switch at one end is depressed, another voltage (+V) is applied to the circuit causing the LEDs at both ends to glow. This is because switch 93 is arranged to complete an electrical path from ground through both LEDs to +V.

Figure 13:
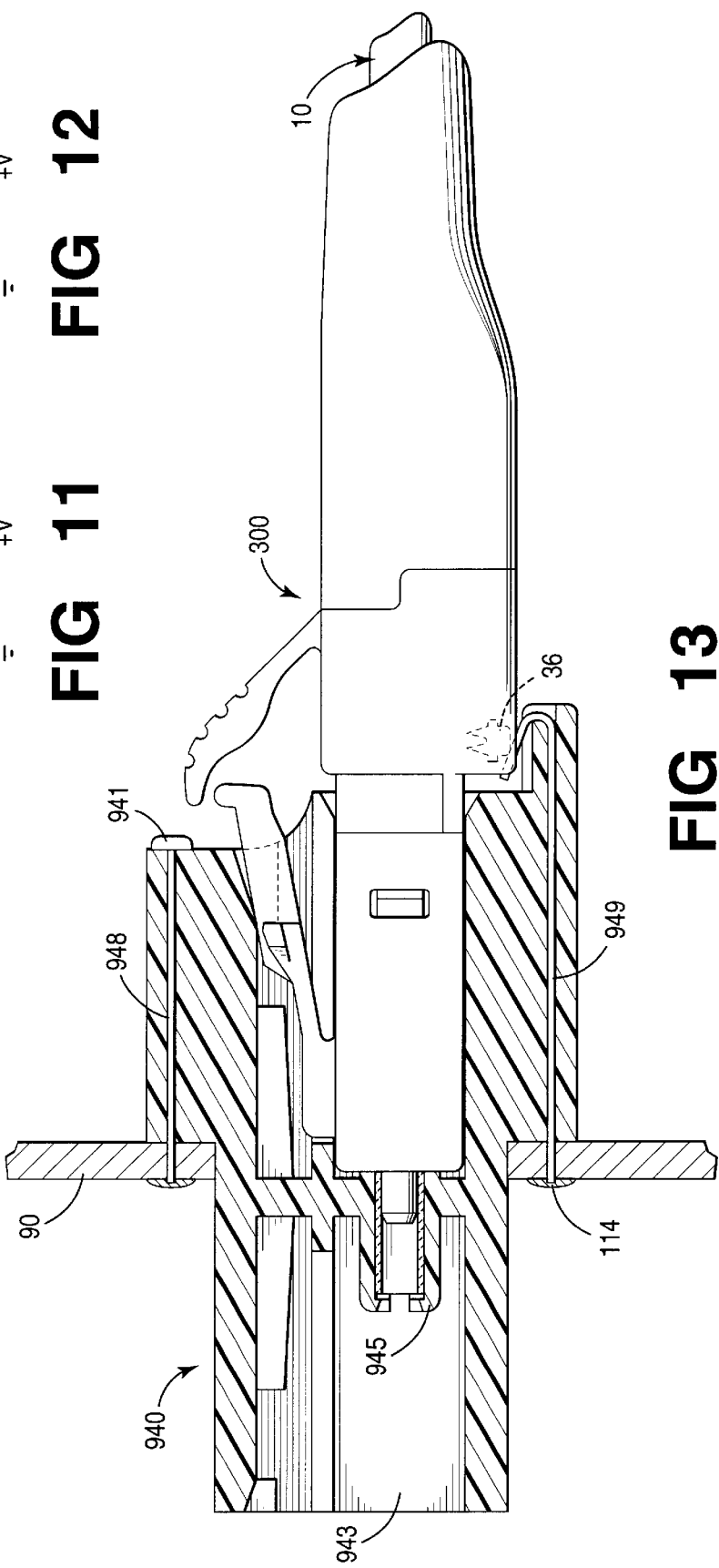
FIG. 13 discloses an optical/electrical plug connector inserted within the jack receptacle of FIG. 10, the jack receptacle being shown in cross section after installation in the patch panel.

In either of the above-described embodiments, the connection of one end of the jumper cable to the receptacle 940 in the patch panel 90 is illustrated in FIG. 13. In the preferred embodiment, LED 941 is molded into the receptacle 940 itself, and the wire pair 948 that conducts electrical current to the LED is installed in the panel. Electrical conductors 949 within the receptacle communicate electrical signals between the panel and the metallic blades 36 in the optical/electrical plug connector 300. For completeness, it is noted that terminal 114 of the circuit shown in FIG. 11 or 12 is electrically joined to one of the conductors 949. Optical signals are communicated between plug connector 300 and another plug connector (not shown) that installs into opening 943 of the jack receptacle 940. This other plug connector includes an optical fiber that extends into a boss 945 that is designed to receive the optical fiber and provide alignment with the optical fiber contained in plug connector 300.

Although various particular embodiments of the present invention have been shown and described, modifications are possible within the scope of the invention. These modifications include, but are not limited to: the use of plastic optical fiber rather than glass fiber; the use of a multi-fiber array rather than a single optical fiber; the use of a single electrical conductor rather than the plurality shown; the use of a light that is separately mounted on the panel rather than an LED that is molded into the jack receptacle; a plug connector having a one-piece housing rather than the two-piece housing structure shown; and a jack receptacle comprising multiple pieces rather than the one-piece structure shown.

What is claimed is:

1. A plug connector for terminating optical and electrical transmission media, the connector comprising:
    a fiber-holding apparatus for receiving and holding an end portion of an optical fiber;
    a dielectric housing structure having one or more internal surfaces that define a first cavity that encloses the end portion of the optical fiber, the housing structure further including: (i) a back opening in the first cavity through which the optical fiber is received, and (ii) a front opening in the first cavity through which the optical fiber protrudes;
    a single cantilever latch for engaging an associated receptacle in a locking relationship, said latch being mounted on a top-side of the housing structure with its fixed end positioned toward the front opening and its free end extending toward the back opening;
    Characterized By
        one or more internal surfaces that define a second cavity in the housing structure for receiving a number (N) of electrical conductors; and
        an equal number (N) of metallic blade terminals that extend into the second cavity from a bottom side of the housing structure and make electrical contact with each of the electrical conductors.

2. The plug connector of claim 1 wherein the dielectric housing has an overall length that extends between its front and back openings, and wherein the metallic blade terminals are positioned behind the front opening of the housing by an amount that exceeds twenty percent of the overall length of the dielectric housing.

3. The plug connector of claim 1 further including a trigger comprising a cantilever mounted on the top side of the housing structure with its fixed end positioned toward the back opening and its free end extending toward the front opening, the free end of the trigger being positioned to slidably engage the free end of the latch when the trigger is depressed.

4. The plug connector of claim 1 wherein the optical fiber comprises a glass fiber.

5. The plug connector of claim 4 wherein the fiber-holding structure comprises
    a cylindrical ferrule having an axial bore for receiving the glass fiber; and
    a base member for holding an end portion of the ferrule, said base member including an axial bore that is collinear with the axial bore of the ferrule.

6. The plug connector of claim 5 further including an annular spring, which is disposed about the base member and which presses against a flange thereof, said spring also pressing against one of the internal surfaces of the first cavity to urge one end of the fiber-holding apparatus through the front opening.

7. The plug connector of claim 1 wherein the housing structure comprises first and second interlocking members, the first member containing the cantilever latch and the second member containing the cantilever trigger, and wherein the second member includes a front end portion that engages and interlocks with a back end portion of the first member.

8. The plug connector of claim 1 wherein the electrical conductors are individually insulated.

9. The plug connector of claim 8 wherein each metallic blade terminal is shaped to pierce the insulation of an insulated electrical conductor.

10. The plug connector of claim 1 wherein N is greater than 1.

11. The plug connector of claim 1 further including a length of cable attached thereto, said cable including at least one optical fiber and at least one electrical conductor.

12. In combination, a hybrid plug connector attached to one or more transmission cables, said cables including:
    (i) an optical fiber; and
    (ii) a plurality of insulated electrical wires, the hybrid plug connector comprising:

(i) a central axis that extends between front and back ends of a dielectric housing;

(ii) a projection at the front end of the housing that contains the optical fiber for insertion into a mating optical receptacle, said projection extending in the direction of the central axis;

(iii) a wire-holding structure, positioned on the bottom side of the housing, for holding the insulated wires;

(iv) a plurality of metallic blades that extend into the wire-holding structure and are shaped to pierce the insulation of and make electrical contact with each of the insulated wires, said blades being positioned behind the front end of the housing by an amount that exceeds twenty percent of the overall length of the dielectric housing; and (v) a latch for securing the housing to the receptacle, the latch including a cantilever mounted on a top-side of the housing, the cantilever latch having a fixed end that is positioned toward the front end of the housing and a free end that extends toward a back end of the housing.

13. The combination of claim 12 wherein the dielectric housing further includes a trigger comprising a cantilever mounted on the top-side of the housing, the trigger having a fixed end that is positioned toward the back end of the housing and a free end that extends toward the front end of the housing, the free end of the trigger being positioned to slidably engage the free end of the latch when the trigger is depressed.

14. The combination of claim 12 further including a length of shrink tubing, which is positioned at the back end of the housing and holds the electrical wires in engagement with the crimp sleeve.

15. The combination of claim 12 wherein the optical fiber is enclosed within a layer of polymeric material to form a buffered fiber.

16. The combination of claim 15 wherein the transmission cable further comprises a plurality of filamentary strength members surrounding the buffered fiber and a plastic jacket surrounding the filamentary strength members.

17. The combination of claim 16 wherein the optical fiber comprises a glass fiber.

18. The combination of claim 17 wherein the filamentary strength members are captured between a crimp tube that extends from the back end of the housing and a crimp sleeve.

19. The combination of claim 12 wherein the dielectric housing comprises first and second interlocking members, the first member containing the front-end projection and the second member containing the wire-holding structure.

20. The combination of claim 12 wherein the optical fiber and the plurality of insulated electrical wires reside within the same cable.

21. A jumper comprising a hybrid communication cable terminated in a hybrid plug at each end;

the hybrid communication cable comprising an optical fiber and an insulated electrical wire enclosed within a plastic jacket, each hybrid plug comprising:

a dielectric housing having an overall length that extends between a front opening from which an end portion of the optical fiber protrudes and a back opening through which the optical fiber is received;

a cantilever latch that is mounted on a top side of the housing for interlocking the housing with a mating jack receptacle;

a cantilever trigger that is mounted on the top side of the housing and positioned to deflect the cantilever latch downward when the trigger is depressed; and an electrical connection assembly positioned on a bottom side of the housing, the assembly including at least one metallic blade terminal that pierces the insulation and makes electrical contact with the insulated electrical wire, said metallic blade terminal being positioned behind the front opening of the housing by an amount that exceeds fifty percent of the overall length of the dielectric housing.

22. The jumper of claim 21 wherein the dielectric housing comprises front and back interlocking members, the front member containing the front-end projection and the cantilever latch; and the back member containing the electrical connection assembly and the cantilever trigger.

23. The jumper of claim 21 wherein the optical fiber comprises a glass fiber.

24. An optical/electrical plug connector comprising an optical plug, a latch, and an electrical plug, the optical plug comprising an elongated plastic body having length, a generally square cross section, and a bore that extends along the length between front and back ends of the body, an optical fiber being disposed within the bore and projecting from the front end thereof;

the latch being affixed to the plastic body on a top side thereof; and the electrical plug being affixed to the plastic body on a bottom side thereof, said electrical plug including a plurality of metallic contacts that are positioned at a midpoint ±30 percent of the length of the plastic body between its front and back ends, whereby electrical connection is delayed during insertion of the plastic body into a mating receptacle.

25. The optical/electrical plug connector of claim 24 wherein the latch comprises an cantilever that is molded into the top side of the plug body, the cantilever having a fixed end that is positioned toward the front end of the plastic body and a free end that extends toward the back end of the plastic body.

26. The optical/electrical plug connector of claim 25 wherein the plastic body comprises first and second interlocking members, the first member containing the cantilever latch and the second member containing the electrical plug, and wherein the second member includes a front end portion that engages and interlocks with a back end portion of the first member.

27. The optical/electrical plug connector of claim 24 further including a length of cable attached thereto, said cable including an optical fiber, a plurality of insulated electrical wires, and a plurality of yarn-like strength members, all surrounded by a plastic jacket.

28. The optical/electrical plug connector of claim 27 wherein the metallic contacts of the electrical plug comprises insulation-piercing blades that are pressed into engagement with the electrical wires.

* * * * *